(12) United States Patent
Wang et al.

(10) Patent No.: US 9,983,446 B2
(45) Date of Patent: May 29, 2018

(54) DISPLAY PANEL WITH SINGLE SUBSTRATE AND FABRICATING METHOD THEREOF

(71) Applicant: BOE TECHNOLOGY GROUP CO., LTD., Beijing (CN)

(72) Inventors: Dongsheng Wang, Beijing (CN); Youmei Dong, Beijing (CN); Wenbo Li, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 14/828,852

(22) Filed: Aug. 18, 2015

(65) Prior Publication Data

US 2015/0355513 A1 Dec. 10, 2015

Related U.S. Application Data

(63) Continuation of application No. 13/991,928, filed as application No. PCT/CN2012/084891 on Nov. 20, 2012, now Pat. No. 9,140,940.

(30) Foreign Application Priority Data

Jun. 21, 2012 (CN) .......................... 2012 1 0211779

(51) Int. Cl.
*G02F 1/1333* (2006.01)
*G02F 1/1343* (2006.01)
(Continued)

(52) U.S. Cl.
CPC ...... *G02F 1/134363* (2013.01); *G02F 1/1334* (2013.01); *G02F 1/1339* (2013.01);
(Continued)

(58) Field of Classification Search
CPC ................ G02F 1/1334; G02F 1/1339; G02F 1/133365; G02F 1/134363; G02F 1/1333; G02F 2201/50; G02F 1/133528
(Continued)

(56) References Cited

U.S. PATENT DOCUMENTS 5,303,073 A * 4/1994 Shirota ................ C09K 19/544
349/74
6,441,880 B1 * 8/2002 Utsumi ............. G02F 1/133788
349/124
(Continued)

FOREIGN PATENT DOCUMENTS

CN 1204064 A 1/1999
CN 1664676 A 9/2005
(Continued)

OTHER PUBLICATIONS

International Search Report Appln. No. PCT/CN2012/084891; Dated Mar. 28, 2013.
(Continued)

*Primary Examiner* — Hoan C Nguyen
(74) *Attorney, Agent, or Firm* — Ladas & Parry LLP

(57) ABSTRACT

The present disclosure provides a single substrate display panel and fabricating method thereof. The fabricating method of a single substrate display panel comprises steps of providing a parallel electric field substrate; and forming a display medium layer above the parallel electric field substrate. The present disclosure also provides a fabricating method of the single substrate display panel. The present disclosure can achieve single substrate display so as to reduce the weight and thickness of the liquid crystal display panel and improve display quality.

18 Claims, 3 Drawing Sheets

(51) Int. Cl.
*G02F 1/1334* (2006.01)
*G02F 1/1339* (2006.01)
*G02F 1/1335* (2006.01)

(52) U.S. Cl.
CPC ...... *G02F 1/133365* (2013.01); *G02F 1/1333* (2013.01); *G02F 1/133528* (2013.01); *G02F 2201/50* (2013.01)

(58) Field of Classification Search
USPC ..................................................... 349/86, 88
See application file for complete search history.

(56) References Cited

U.S. PATENT DOCUMENTS

| | | | |
|---|---|---|---|
| 6,449,024 | B1 | 9/2002 | Hirakata et al. |
| 6,476,887 | B1 | 11/2002 | Sekine et al. |
| 2002/0196390 | A1 | 12/2002 | Penerman et al. |
| 2005/0018124 | A1 | 1/2005 | Liao et al. |
| 2006/0204675 | A1* | 9/2006 | Gao ................ G02F 1/133305 428/1.1 |
| 2008/0239198 | A1 | 10/2008 | Kim et al. |
| 2009/0103018 | A1* | 4/2009 | Matsumori ......... G02F 1/13363 349/96 |
| 2010/0171903 | A1 | 7/2010 | Okuyama |
| 2012/0062448 | A1* | 3/2012 | Kim ................ G02F 1/133377 345/55 |
| 2012/0062807 | A1* | 3/2012 | Baek ................ G02F 1/134363 349/33 |
| 2013/0229595 | A1 | 9/2013 | Shinkai et al. |

FOREIGN PATENT DOCUMENTS

| | | |
|---|---|---|
| CN | 1877400 A | 12/2006 |
| CN | 1932598 A | 3/2007 |
| CN | 101493626 A | 7/2009 |
| CN | 20214877 U | 2/2012 |
| CN | 102736304 A | 10/2012 |
| EP | 0488116 A2 | 6/1992 |
| EP | 1927640 A1 | 6/2008 |
| EP | 2204690 A1 | 7/2010 |
| JP | 63278036 A | 11/1988 |
| JP | 09211434 A | 6/1997 |
| JP | 2000-206515 A | 7/2000 |
| JP | 2004-514934 A | 5/2004 |
| JP | 2005-043841 A | 2/2005 |
| JP | 2007-271846 A | 10/2007 |
| JP | 2010-072394 A | 4/2010 |
| JP | 2010-091820 A | 4/2010 |
| JP | 2010-157475 A | 7/2010 |
| JP | 2011-215210 A | 10/2011 |
| KR | 20080089743 A | 10/2008 |
| WO | 03/010593 A1 | 2/2003 |

OTHER PUBLICATIONS

International Preliminary Report on Patentability Appln. No. PCT/CN2012/084891; Dated Dec. 23, 2014.
Korean Office Action Appln. No. 10-2013-7008590; Dated Apr. 24, 2014.
Korean Examination Opinion Appln. No. 10-2013-7008590; Dated Oct. 21, 2014.
First Chinese Office Action Appln. No. 201210211779.2; Dated Mar. 31, 2014.
Second Chinese Office Action Appln. No. 201210211779.2; Dated Sep. 29, 2014.
Chinese Rejection Decision Appln. No. 201210211779.2; Dated Feb. 28, 2015.
USPTO RR dated Oct. 1, 2014 U.S. Appl. No. 13/991,928.
USPTO Non-Final Office Action dated Dec. 23, 2014 U.S. Appl. No. 13/991,928.
USPTO Notice of Allowance dated Jun. 1, 2015 U.S. Appl. No. 13/991,928.
Japanese Office Action dated Sep. 8, 2016; Appln. No. 2015-517581.
Final Japanese Office Action dated Mar. 17, 2017; Appln. No. 2015-517581.
Extended European Search Report dated Jan. 5, 2016; Appln. 12852448.5-1904/2866078 PCT/CN2012084891.
A communication from the EPO dated Feb. 28, 2018; Appln. No. 12 852 448.5.

\* cited by examiner

DISPLAY PANEL WITH SINGLE SUBSTRATE AND FABRICATING METHOD THEREOF

FIELD

The present disclosure relates to field of liquid crystal display, in particular to a single substrate display panel and a fabricating method thereof.

BACKGROUND

Liquid crystal display has replaced cathode ray tube (CRT) display and been used in a wide variety of display apparatuses.

Conventional liquid crystal display panel typically includes two substrates of a thin film transistor array substrate and a color filter substrate with liquid crystal materials filled therebetween. The orientations of the liquid crystals are controlled by the array substrate in order to display images on the liquid crystal display panel. All conventional liquid crystal display panels include two substrates and consequently have large weight and thickness, therefore they can not fulfill the demands for lighter and thinner liquid crystal device.

SUMMARY

The present disclosure provides a single substrate display panel and a fabricating method thereof. The present disclosure can achieve image display with a single substrate so as to reduce the weight and thickness of the liquid crystal display panel, simplify the fabricating process of the liquid crystal panel, reduce cost and improve display quality.

In order to solve the above technical problem, the embodiments of the present disclosure provide following technical solutions.

In one aspect, the present disclosure provides a single substrate display panel. The single substrate display panel comprises a parallel electric field substrate and a display medium layer above the parallel electric field substrate.

In one example, the display medium layer comprises liquid crystal molecules and a matrix. The matrix encapsulates the liquid crystal molecules so that the liquid crystal molecules form liquid crystal groups.

In one example, the liquid crystal molecules have an ordinary refractive index $n_o$ in a non rotational state without being actuated by an electric field and an extraordinary refractive index $n_e$. The ordinary refractive index $n_o$ matches with refractive index $n_p$ of the matrix, and the extraordinary refractive index $n_e$ does not match with the refractive index $n_p$ of the matrix. Alternatively, the liquid crystal molecules have an extraordinary refractive index $n_e$ in a rotational state upon being actuated by an electric field and an ordinary refractive index $n_o$. The extraordinary refractive index $n_e$ matches with refractive index $n_p$ of the matrix, and the ordinary refractive index $n_o$ does not match with the refractive index np of the matrix.

In one example, the matrix comprises a polymer.

In one example, the matrix comprises a liquid crystal polymer with rigid structure.

In one example, the liquid crystal polymer has a weight percentage of 1-5% in the display medium layer.

In one example, the display medium layer further comprises spacers.

In one example, the spacers have a weight percentage of 0.01-5% in the display medium layer.

In one example, the spacers have a weight percentage of 0.1-1% in the display medium layer.

In one example, an upper polarizer with moisture and oxygen resistance is formed above the display medium layer.

In one example, a protective layer with moisture and oxygen resistance is formed above the display medium layer.

In one example, the protective layer is a protective adhesive or a protective film attached on an adhesive.

In one example, the single substrate display panel comprises a color filter layer formed above the display medium layer, or above, below the substrate or between the display medium layer and the substrate.

In one example, the single substrate display panel further comprises a polarizer. The polarizer and the display medium layer are formed on the same side or opposite sides of the substrate.

In one example, the single substrate display panel comprises a lower polarizer formed below the substrate or between the substrate and the display medium layer.

In another aspect, the present disclosure provides a fabricating method of a single substrate display panel. The single substrate display panel comprises steps of: providing a parallel electric field substrate and forming a display medium layer above the parallel electric field substrate.

In one example, the step of forming a display medium layer above the parallel electric field substrate further comprises applying a composite at least comprising liquid crystal molecules and a monomer on the parallel electric field substrate; and curing the applied composite so as to form the display medium layer.

In one example, the step of forming a display medium layer above the parallel electric field substrate further comprises: applying a composite at least comprising liquid crystal molecules and a monomer on the parallel electric field substrate; attaching a temporary substrate to the substrate applied with the composite and curing the composite between the temporary substrate and the substrate so as to form the display medium layer; and removing the temporary substrate.

In one example, the monomer in the applied composite has a weight percentage of 1-5% in the composite.

In one example, the monomer in the applied composite is a liquid crystal monomer with a rigid structure and the liquid crystal monomer with the rigid structure has a weight percentage of 1-5% in the composite single substrate display panel In one example, the applied composite on the parallel electric field substrate further comprises a photo initiator or a thermal initiator and the step of curing the composite are performed with radiation or heating.

In one example, the photo initiator or thermal initiator in the applied composite has a weight percentage of 0.01-20% in the composite.

In one example, the photo initiator or thermal initiator in the applied composite has a weight percentage of 5-10% in the composite.

In one example, the applied composite applied on the parallel electric field substrate further comprises spacers.

In one example, the spacers in the applied composite have a weight percentage of 0.01-5% in the composite.

In one example, a protective layer is formed above the display medium layer.

In one example, the protective layer is a protective adhesive or a protective film attached on an adhesive.

In one example, a color filter layer can be formed above the display medium layer or above, below the substrate or between the display medium layer and the substrate.

In one example, a lower polarizer is formed below the substrate or between the substrate and the display medium layer.

In one example, an upper polarizer is formed above the display medium layer.

According to present disclosure, image display can be achieved with a single substrate, thus reducing the weight and thickness of the liquid crystal display panel and improving the display quality.

BRIEF DESCRIPTION OF THE DRAWINGS

The accompanying drawings of technical solutions of the present disclosure or the prior art are briefly described as following for better illustration of the technical solutions of the present disclosure or the prior arts. It is apparent that the accompanying drawings as described below are mere illustrations for some embodiments of the technical solutions of the present disclosure and thus other accompanying drawings are readily conceivable based on these accompanying drawings for the skilled in the art without creative works.

DETAILED DESCRIPTION OF THE PREFERRED EMBODIMENTS

The technical solutions of embodiments of the present disclosure will be described in more detail with reference to the accompanying drawings. It is apparent that the embodiments as described are merely a part of embodiments of the present disclosure and do not represent all embodiments. All other embodiments readily conceivable by the skilled in the art based on the described embodiments of the present disclosure without creative works fall into the protection scope of the present disclosure.

First Embodiment

Figure 1:
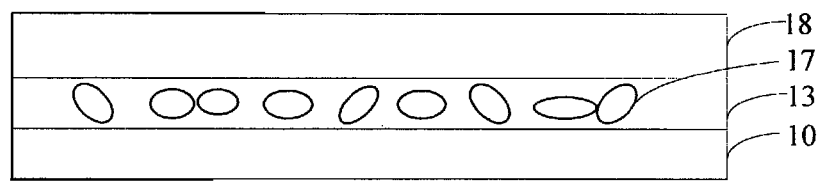
FIG. 1 is a schematic view of a single substrate display panel according to a first embodiment of the present disclosure.

FIG. 1 is a schematic view of a single substrate display panel according to a first embodiment of the present disclosure. As shown in FIG. 1, the single substrate display panel according to the present embodiment includes: a parallel electric field substrate 10 and a display medium layer 13 formed above the parallel electric field substrate 10. The parallel electric field substrate 10 can be an array substrate in a parallel electric field mode such as IPS, FFS and ADS substrate commonly used in display field; or other simple passive parallel electric field substrates such as segment or passive matrix parallel electric field substrate. The display medium layer 13 includes liquid crystal molecules and a matrix encapsulating the liquid crystal molecules so that the liquid crystal molecules form liquid crystal groups 17. Each liquid crystal group 17 has a spherical shape for example or other shapes. The liquid crystal molecules of the liquid crystal group 17 have an ordinary refractive index $n_o$ matched with a refractive index $n_p$ of the matrix and an extraordinary refractive index $n_e$ greater than the refractive index $n_p$ of the matrix. The ordinary refractive index $n_o$ refers to the refractive index of the liquid crystal molecules in a non rotational state without being actuated by electric field. The extraordinary refractive index $n_e$ refers to the refractive index of the liquid crystal molecules in a rotational state actuated by electric field.

In the present embodiment, the matrix of the display medium layer includes a liquid crystal polymer with rigid structure, which is formed of a liquid crystal monomer by photo curing under UV (ultraviolet) radiation or thermal curing. The monomer has double bond functional groups, rigid structure and polymerization ability. The liquid crystal polymer includes liquid crystal units so that the liquid crystal polymer has properties of liquid crystal. If there is no electric field applied to the liquid crystal molecules of the liquid crystal group 17, the liquid crystal polymer of the matrix and liquid crystal molecules of the liquid crystal group 17 have the same orientation, and the network of the liquid crystal polymer of the matrix is a planar network. In this case, the ordinary refractive index $n_o$ of the liquid crystal molecule in the liquid crystal group 17 matches with the refractive index $n_p$ of the liquid crystal polymer of the matrix, thereby the single substrate display panel presents a transparent state. If there is an electric field applied to the liquid crystal molecules in the liquid crystal group 17, the liquid crystal molecules rotate as being actuated by the electrical field. In this case, the liquid crystal polymer of the matrix and liquid crystal molecules of the liquid crystal group 17 have different orientations, such that the lights will be refracted, reflected multiple time within the liquid crystal group 17 before diffusing, thereby the single substrate display panel displays an opalescence color.

Therefore, the present embodiment can achieve image display with a single substrate without polarizer, thus reducing the product cost and simplifying the fabricating process. In addition, the single substrate display panel according to the present embodiment can further improve brightness of the display panel and reduce thickness of the single substrate display panel since there is no need to attach polarizer, therefore making the display panel lighter and thinner.

Furthermore, the liquid crystal polymer has a weight percentage of about 1-5% in the display medium layer 13, which can further improve display quality.

Furthermore, the display medium layer 13 can further include photo initiator or thermal initiator. If the photo initiator or thermal initiator is added into the monomer materials before polymerization of the matrix, polymerization of the monomers will be more efficient with better property.

Furthermore, in order to maintain a stable thickness of the display medium layer, the present embodiment can further include pillar like or sphere like spacers added in the display medium layer 13 in order to stabilize the properties of the device. The spacers have a weight percentage of about 0.01-5%, preferably about 0.1-1% in the display medium layer 13.

Furthermore, a protective layer 18 can be formed on the display medium layer 13 in the present embodiment by applying a layer of protective adhesive onto the display medium layer 13. Alternative, the protective layer 18 can be formed by applying a layer of adhesive onto the display medium layer 13 and then attaching a layer of protective film. The protective layer 18 can resist moisture and oxygen in order to provide maximum protection for the underneath display medium layer 13. The protective adhesive or adhesive employed by the present embodiment imposes a lower contamination risk on the display medium layer with no or little impact on the display quality. Since the protective layer 18 on the display medium layer 13 can protect the display medium layer 13 due to the moisture and oxygen resistance, the stability and reliability of the display product can be further improved.

Second Embodiment

Figure 2:
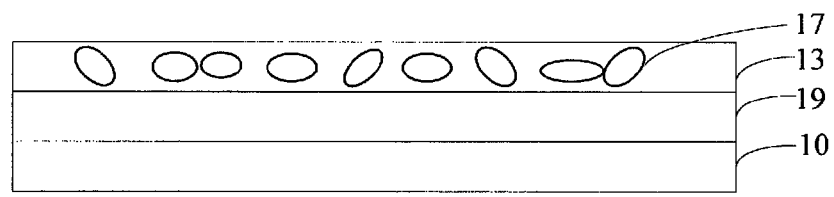
FIG. 2 is a schematic view of a single substrate display panel according to a second embodiment of the present disclosure.

FIG. 2 is a schematic view of a single substrate display panel according to a second embodiment of the present disclosure. As shown in FIG. 2, the single substrate display panel according to the present embodiment includes a parallel electric field substrate 10 and a display medium layer 13 formed above the parallel electric field substrate 10. The display medium layer 13 includes liquid crystal molecules and a matrix encapsulating the liquid crystal molecules so that the liquid crystal molecules form liquid crystal groups 17. The above components can have substantially same structure as the first embodiment except that the present embodiment further includes a color filter layer 19 on the parallel electric field substrate 10. As shown in FIG. 2, the color filter layer 19 can be formed between the parallel electric field substrate 10 and the display medium layer 13.

In the present embodiment, the matrix of the display medium layer 13 includes a liquid crystal polymer with rigid structure, which is formed of a liquid crystal monomer by photo curing under UV (ultraviolet) radiation or thermal curing. The monomer has double bond functional groups, rigid structure and polymerization ability. The liquid crystal polymer includes liquid crystal units so that the liquid crystal polymer has properties of liquid crystal. If there is no electric field applied to the liquid crystal molecules of the liquid crystal group 17, the liquid crystal polymer of the matrix and liquid crystal molecules of the liquid crystal group 17 have the same orientation, and the network of the liquid crystal polymer of the matrix is a planar network. In this case, the ordinary refractive index $n_o$ of the liquid crystal molecule in the liquid crystal group 17 matches with the refractive index $n_p$ of the liquid crystal polymer of the matrix, the lights can transmit the liquid crystal groups 17 encapsulated by the matrix, thereby the single substrate display panel displays a color presented upon being filtered by the color filter layer. For example, if the lights is blocked by a black matrix of the color filter layer, a black image will be displayed; if the lights pass through a blue color filter layer, a blue image will be displayed; if the lights pass through a red color filter layer, a red image will be displayed; if the lights pass through a green color filter layer, a green image will be displayed. If there is an electric field applied to the liquid crystal molecules in the liquid crystal group 17, the liquid crystal molecules rotate as being actuated by the electrical field. In this case, the liquid crystal polymer of the matrix and liquid crystal molecules of the liquid crystal group 17 have different orientations, such that the lights will be refracted, reflected multiple time within the liquid crystal group 17 before diffusing, thereby the single substrate display panel displays an opalescence color.

Therefore, the single display panel according to the present embodiment can display an opalescence color and a color presented by corresponding color filter layer 19. For the above colors, one color can be used as the color of contents such as text or image and the other color can be used as background color.

Therefore, the present embodiment can achieve image display with a single substrate without polarizer, thus reducing the cost of the product and simplifying the fabricating process. In addition, the single substrate display panel according to the present embodiment can further improve brightness of the display panel and reduce thickness of the single substrate display panel. Since the single substrate display panel of the present embodiment includes a color filter layer, enabling rich colorful presentations so as to improve display quality.

Furthermore, the color filter layer 19 according to the present embodiment is not limited to the location between the parallel electric field substrate 10 and the display medium layer 13 and can be disposed other locations. For example, the color filter layer 19 and the parallel electric field substrate 10 can be disposed on opposite sides of the substrate 10 respectively, or the display medium layer 13 and color filter layer 19 can be formed sequentially above the substrate 10.

Third Embodiment

Figure 3:
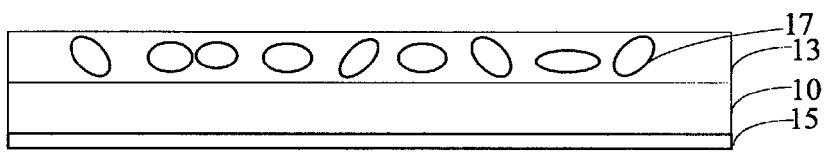
FIG. 3 is a schematic view of a single substrate display panel according to a third embodiment of the present disclosure.

FIG. 3 is a schematic view of a single substrate display panel according to a third embodiment of the present disclosure. As shown in FIG. 3, the single substrate display panel of the present embodiment includes: a parallel electric field substrate 10 and a display medium layer 13 formed above the parallel electric field substrate 10. The parallel electric field substrate 10 can be an array substrate in a parallel electric field mode such as IPS, FFS and ADS substrate commonly used in display field; or other simple passive parallel electric field substrates such as segment or passive matrix parallel electric field substrate. The display medium layer 13 includes liquid crystal molecules and a matrix encapsulating the liquid crystal molecules so that the liquid crystal molecules form liquid crystal groups 17. Each liquid crystal group 17 has a spherical shape for example or other shapes. A lower polarizer 15 is attached below the substrate 10. The display medium layer 13 and the lower polarizer 15 are formed on opposite sides of the substrate 10. The matrix of the present embodiment is polymer. In one example, the matrix has a weight percentage of about 1%-5%, preferably about 5%-15% in the display medium layer 13. The liquid crystal molecules have an ordinary refractive index $n_o$ matched with a refractive index $n_p$ of the matrix, alternatively the liquid crystal molecules have an extraordinary refractive index $n_e$ matched with the refractive index $n_p$ of the matrix. The ordinary refractive index $n_o$ refers to the refractive index of the liquid crystal molecules in a non rotational state without being actuated by electric field. The extraordinary refractive index $n_e$ refers to the refractive index of the liquid crystal molecules in a rotational state upon being actuated by electric field.

Figure 6:
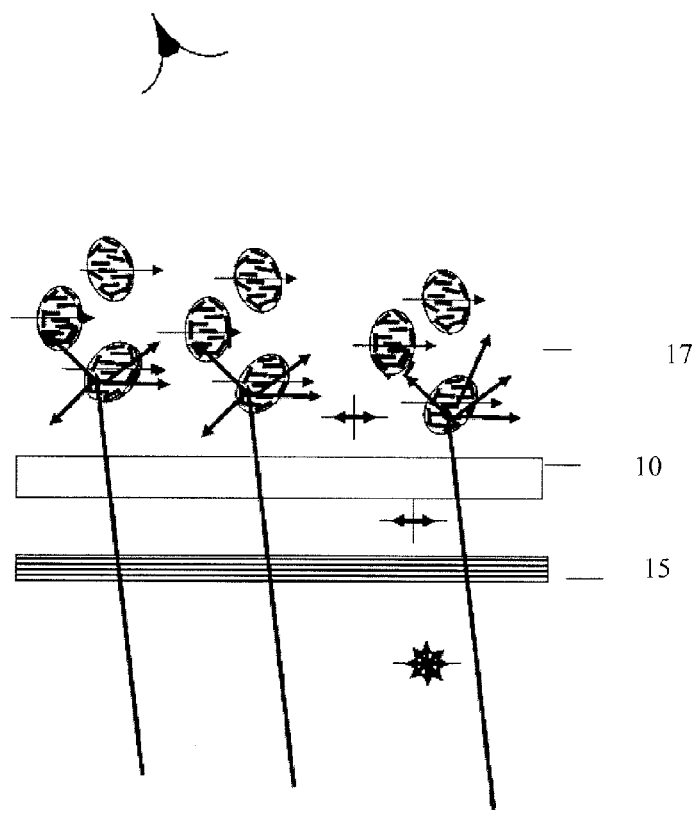
FIG. 6 is a first schematic view showing light propagation in the single substrate display panel according to the third embodiment of the present disclosure.
Figure 7:
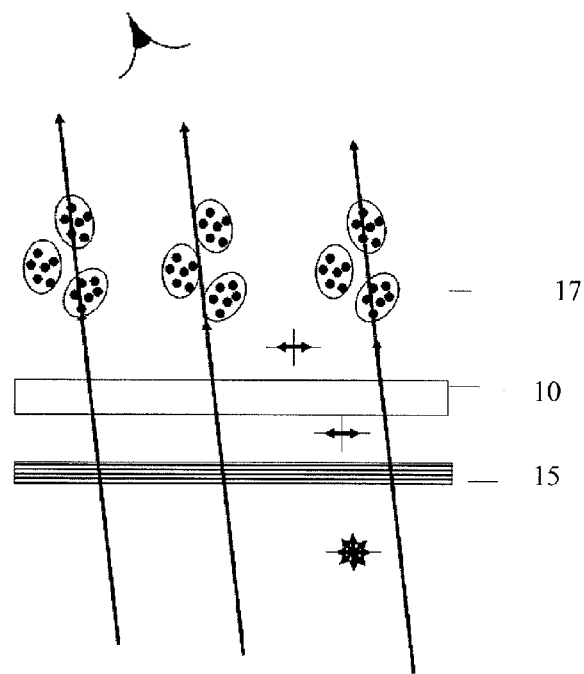
FIG. 7 is a second schematic view showing light propagation in the single substrate display panel according to the third embodiment of the present disclosure.

When the single substrate display panel operates in the present embodiment, the light emitted by a backlight module (not shown) below the display panel is transformed into a polarization light after passing through the lower polarizer 15. As shown in FIG. 6, if there is no electric field applied to the liquid crystal molecules of the liquid crystal group 17, the polarization light has a direction parallel to major axis of the liquid crystal molecule so that the refractive index of the liquid crystal molecules for the polarization light is $n_o$. If the refractive index $n_o$ of the liquid crystal molecule does not match with the refractive index $n_p$ of the matrix, the lights will be refracted, reflected multiple time within the liquid crystal group 17 before diffusing, thereby the single substrate display panel displays an opalescence color. As shown in FIG. 7, if an electric field is applied to the liquid crystal molecules of the liquid crystal group 17, the liquid crystal molecules are rotated under the electric field. In this case, the polarization light has a direction perpendicular to director of the liquid crystal molecule so that the refractive index of the liquid crystal molecules for the polarization light is $n_e$. If the refractive index $n_e$ of the liquid crystal molecule matches with the refractive index $n_p$ of the matrix, the lights will be transmitted through the liquid crystal group 17, thereby the single substrate display panel presents a transparent state. The opalescence color displayed by the display panel can be used to display text or image, and the transparent state of the display panel allows the objects behind the single substrate display panel to be seen.

Alternatively, in the present embodiment, if there is no electric field applied to the liquid crystal molecules of the liquid crystal group 17, the orientation of the liquid crystal molecules in the display medium layer 13, that is, the major axis of the liquid crystal molecule can be perpendicular to the transmissive axis of the lower polarizer 15, so that the refractive index of the liquid crystal molecules for the polarization light is $n_o$. If the refractive index $n_o$ of the liquid crystal molecule matches with the refractive index $n_p$ of the matrix, the single substrate display panel presents a transparent state to achieve transparent display. If an electric field is applied to the liquid crystal molecules of the liquid crystal group 17, the refractive index of the liquid crystal molecules for the polarization light is $n_e$. If the refractive index $n_e$ of the liquid crystal molecules does not match with the refractive index $n_p$ of the matrix, the single substrate display panel displays an opalescence color. Therefore, in the present embodiment, with the same structure of the single substrate display panel, opposite initial optical properties can be achieved by using different orientations of the polarizer and different orientations of liquid crystal molecules, therefore different product requirements for different occasions can be met so as to save fabricating cost.

The single substrate display panel according to the present embodiment has only one substrate and one polarizer, thus reducing weight and thickness of the liquid crystal display panel, reducing fabricating cost of the liquid crystal display, which in turn complies with the technical trends of thinner lighter display with low cost.

In one example, the display medium layer 13 of the present embodiment can further include a photo initiator or thermal initiator. If the photo initiator or thermal initiator is added into the monomer materials before polymerization of the matrix, polymerization of the monomer will be more efficient with better property.

In one example, in order to maintain a stable thickness of the display medium layer, the present embodiment can further include pillar like or sphere like spacers added in the display medium layer 13 in order to stabilize the properties of the device. The spacers have a weight percentage of about 0.01-5%, preferably about 0.1-1% in the display medium layer 13.

Fourth Embodiment

Figure 4:
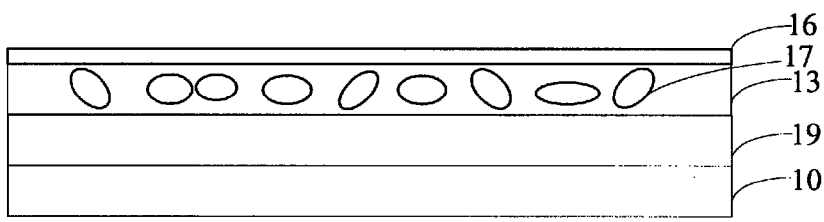
FIG. 4 is a schematic view of a single substrate display panel according to a fourth embodiment of the present disclosure.

FIG. 4 is a schematic view of a single substrate display panel according to a fourth embodiment of the present disclosure. As shown in FIG. 4, the single substrate display panel of the present embodiment includes: a parallel electric field substrate 10, a color filter layer 19 disposed above the parallel electric field substrate 10, a display medium layer 13 formed above the color filter layer 19 and an upper polarizer 16 formed above the display medium layer 13. The display medium layer 13 includes liquid crystal molecules and a matrix encapsulating the liquid crystal molecules so that the liquid crystal molecules form liquid crystal groups 17. The upper polarizer 16 and the display medium layer 13 are formed on the same side of the substrate 10.

Figure 8:
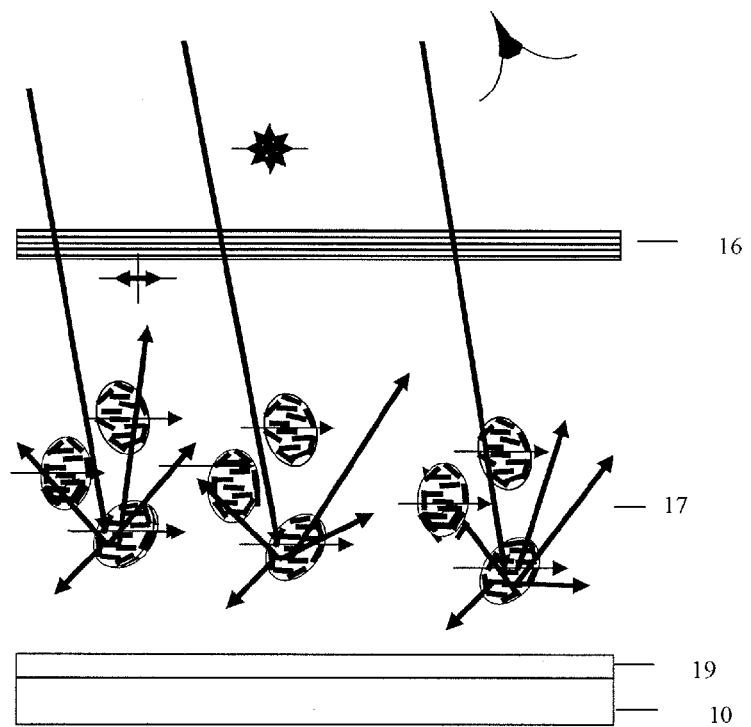
FIG. 8 is a first schematic view showing light propagation in the single substrate display panel according to the fourth embodiment of the present disclosure.
Figure 9:
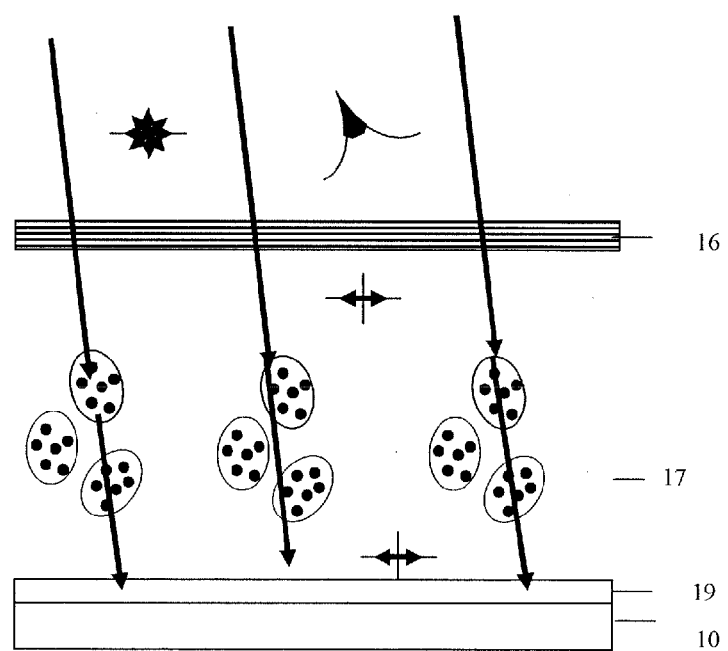
FIG. 9 is a second schematic view showing light propagation in the single substrate display panel according to the fourth embodiment of the present disclosure.

The liquid crystal molecules in the display medium layer 13 have an orientation parallel to the transmissive axis of the upper polarizer 16. As shown in FIG. 8, if there is no electric field applied to the liquid crystal molecules of the liquid crystal group 17, ambient light is transformed into linear polarization light after passing through the upper polarizer 16. The direction of the polarization light is parallel to the major axis of the liquid crystal molecule so that the refractive index of the liquid crystal molecules for the polarization light is $n_o$. If the refractive index $n_o$ of the liquid crystal molecule does not match with the refractive index $n_p$ of the matrix, the lights will be refracted, reflected multiple time within the liquid crystal group 17 before diffusing from the upper polarizer 16, thereby the single substrate display panel displays an opalescence color. As shown in FIG. 9, if an electric field is applied to the liquid crystal molecules of the liquid crystal group 17, the liquid crystal molecules are rotated under the electric field. In this case, the polarization light has a direction perpendicular to director of the liquid crystal molecule so that the refractive index of the liquid crystal molecules for the polarization light is $n_e$. If the refractive index $n_e$ of the liquid crystal molecule matches with the refractive index $n_p$ of the matrix, the lights will be transmitted through the liquid crystal group 17, thereby the single substrate display panel displays a color presented upon being filtered by the color filter layer 19. For example, if the lights are blocked by a black matrix of the color filter layer, a black image will be displayed; if the lights pass through a blue color filter layer, a blue image will be displayed; if the lights pass through a red color filter layer, a red image will be displayed; if the lights pass through a green color filter layer, a green image will be displayed.

Alternatively, in the present embodiment, if there is no electric field applied to the liquid crystal molecules of the liquid crystal group 17, the orientation of the liquid crystal molecules in the display medium layer 13 can be perpendicular to the transmissive axis of the upper polarizer 16, the polarization light has a direction perpendicular to the director of the liquid crystal molecules so that the refractive index of the liquid crystal molecules for the polarization light is $n_o$. If the refractive index $n_o$ of the liquid crystal molecule matches with the refractive index $n_p$ of the matrix, the lights can transmit through the liquid crystal group 17 encapsulated by the matrix, thereby the single substrate display panel displays a color presented by the color filter layer 19. For example, if the lights are blocked by a black matrix of the color filter layer, a black image will be displayed; if the lights pass through a blue color filter layer, a blue image will be displayed; if the lights pass through a red color filter layer, a red image will be displayed; if the lights pass through a green color filter layer, a green image will be displayed. If an electric field is applied to the liquid crystal molecules of the liquid crystal group 17, the liquid crystal molecules are rotated under the electrical field. In this case, ambient lights are transformed into linear polarization lights after passing through the upper polarizer 16. The direction of the polarization light is parallel to the major axis of the liquid crystal molecule so that the refractive index of the liquid crystal molecules for the polarization light is $n_e$. If the refractive index $n_e$ of the liquid crystal molecules does not match with the refractive index $n_p$ of the matrix, the lights will be refracted, reflected multiple time within the liquid crystal group 17 before diffusing from the upper polarizer 16 so that the single substrate display panel displays an opalescence color.

Therefore, the single display panel according to the present embodiment can display an opalescence color and a color presented by corresponding color filter layer 19. For the above colors, one color can be used as the color for contents such as text or image and the other color can be used as background color.

Therefore, in the present embodiment, with the same structure of the single substrate display panel, opposite initial optical properties of the single substrate display panel can be achieved by using different orientations of the polarizer and different orientations of liquid crystal molecules, therefore different product requirements for different occasions can be met so as to save the fabricating cost.

Fifth Embodiment

Figure 5:
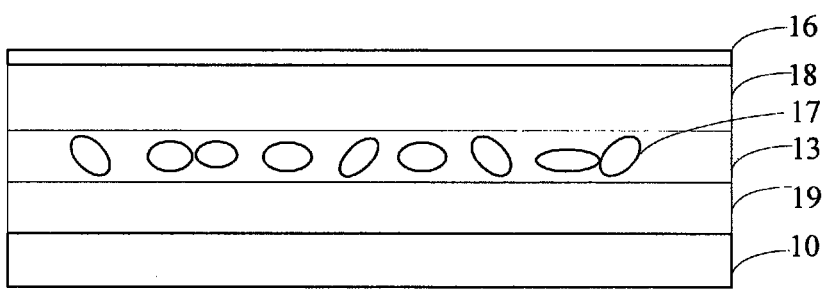
FIG. 5 is a schematic view of a single substrate display panel according to a fifth embodiment of the present disclosure.

FIG. 5 is a schematic view of a single substrate display panel according to a fourth embodiment of the present disclosure. As shown in FIG. 5, the single substrate display panel of the present embodiment includes: a parallel electric field substrate 10, a color filter layer 19 disposed above the parallel electric field substrate 10, a display medium layer 13 formed above the color filter layer 19, a protective layer 18 formed above the display medium layer 13 and an upper polarizer 16 formed above the protective layer 18. The display medium layer 13 includes liquid crystal molecules and a matrix encapsulating the liquid crystal molecules so that the liquid crystal molecules form liquid crystal groups 17. A protective layer 18 can be formed by applying a layer of adhesive onto the display medium layer 13 and then attaching a layer of protective film. The protective layer 18 can resist moisture and oxygen in order to provide maximum protection for the underneath display medium layer 13. The protective adhesive or adhesive employed by the present embodiment imposes a lower contamination risk on the display medium layer 13 with no or little impact on the display quality.

Other aspects of the present embodiment are similar to the fourth embodiment and will not be repeated herein.

In the present embodiment, the protective layer 18 on the display medium layer 13 can protect the display medium layer 13 due to the moisture and oxygen resistance, therefore the stability and reliability of the display product can be further improved.

In one example, if the polarizer disposed above the display medium layer can also have moisture and oxygen resistance, it is possible not to form the protective layer on the display medium layer. Instead, the polarizer with moisture and oxygen resistance can protect the underneath display medium layer so as to further simplify the process and lower the cost.

The first to fifth embodiments are only examples of the present disclosure. Various modifications are available in lights of the present disclosure, such as presence or absence of the protective layer and the position of the protective layer. For example, the protective layer can also be disposed above the upper polarizer. The lower polarizer of the third embodiment can also be disposed below the parallel electric field substrate or interposed between the layers. Furthermore, depending on the display content and display requirements, the color filter layer can be disposed or not disposed, can be disposed above, below the parallel electric field substrate or interposed between layers. The above modifications are all considered as contents of the present disclosure.

The other aspect of the present disclosure can provide a fabricating method of the above single substrate display panel includes following steps of: a, providing a parallel electric field substrate; and b, providing a display medium layer above the parallel electric field substrate. The parallel electric field substrate provided can be an array substrate in a parallel electric field mode such as IPS, FFS and ADS substrate commonly used in display field; or other simple passive parallel electric field substrates such as segment or passive matrix parallel electric field substrate.

The above step b can be achieved by two solutions described as below:

Solution 1 comprises following steps of

C11, an alignment film such as PI (polyimide) is applied on the parallel electric field substrate by a conventional process, and then the alignment film is oriented with friction or radiation so that the alignment direction of the alignment film is preferably either parallel or perpendicular to the electric field direction in order to form an alignment layer.

C12: a composite including the liquid crystal molecules and monomers is applied on the alignment layer in a predetermined thickness. The monomer has a weight percentage of about 1%-5%, preferably 5-15% in the composite.

In one example, the composite further includes photo initiator or thermal initiator or spacers. The spacers have a weight percentage of about 0.01-5%, preferably about 0.1-1% in the composite, the photo initiator or thermal initiator has a weight percentage of about 0.01-20%, preferably about 5-10% in the composite.

C13: After applying the composite, the composite is photo cured by UV light or thermal cured so as to form display medium layer.

Solution 2 comprises following steps of

C21, an alignment film such as PI (polyimide) is applied on the parallel electric field substrate by a conventional process, and then the alignment film is oriented with friction or radiation so that the alignment direction of the alignment film is preferably either parallel or perpendicular to the electric field direction in order to form an alignment layer.

C22: a composite including the liquid crystal molecules and monomers is applied on the alignment layer in a predetermined thickness. The monomer has a weight percentage of about 1%-5%, preferably 5-15% in the composite.

In one example, the composite further includes photo initiator or thermal initiator or spacers. The spacers have a weight percentage of about 0.01-5%, preferably about 0.1-

1% in the composite, the photo initiator or thermal initiator has a weight percentage of about 0.01-20%, preferably about 5-10% in the composite.

C23: A temporary substrate is attached to the substrate with applied composite and the spacing therebetween can be controlled by the spacers within the composite. The attachment process of the substrates (step C23) and applying process of the composite (step C22) can be performed simultaneously. After attachment process of the substrates and applying process of the composite, the composite is photo cured by UV light or thermal cured so as to form display medium layer.

C24: The temporary substrate is removed. Preferably the temporary substrate can be attached with a releasing layer so as to facilitate the removing process. When the temporary substrate attached with the releasing layer is removed, the releasing layer is firstly detached from the temporary substrate, then the releasing layer and the cured display medium layer is detached.

If the substrate is a rigid substrate and the temporary substrate can be a flexible substrate with the releasing layer, the attachment process of the substrates can be carried out by a conventional flexible to rigid process. If the substrate is a flexible substrate and the temporary substrate can be a rigid substrate with the releasing layer, the attachment process of the substrates can be also carried out by a conventional flexible to rigid process. If the substrate is a flexible substrate, the temporary substrate can be a flexible substrate with the releasing layer, the attachment process of the substrates can be also carried out by a conventional roll to roll process.

In one example, a layer of protective adhesive can be applied on the display medium layer as a protective layer. It is noted that the protective adhesive need be transparent and have moist and oxygen resistance in order to provide maximum protection for the underneath display medium layer. The display medium layer can be also protected by first applying a layer of adhesive on the display medium layer then attaching a layer of protective film. The employed protective adhesive or adhesive imposes low risk of contamination on the display medium layer with no or little impact on the display quality.

In one example, a polarizer can be disposed above the display medium layer or above, below the substrate or between the display medium layer and the substrate. If the display medium layer is covered by an upper polarizer with moist and oxygen resistance, there is no need to form protective layer on the display medium layer and the upper polarizer will protect the underneath display medium layer.

In one example, a color filter layer can be formed above the display medium layer or above, below the substrate or between the display medium layer and the substrate.

The present disclosure can achieve image display with single substrate, reduce weight and thickness of liquid crystal display panel and improve display quality.

All the means and applications described in device embodiments also apply to method embodiments of, and achieve the same technical effect and will not be repeated herein to avoid redundancy.

In respective method embodiments, the labels of respective steps are not used to limit the order of the steps. The modification of the order of the respective steps by the skilled in the art without creative work still fall into protection scope of the present disclosure.

The above embodiments are intended only to illustrate the present invention and not limit the present invention. Various modifications and variations can be made by the skilled in the art without departing the spirit and scope of the present invention, such that all those equivalent solutions also fall into protection scope of the present invention which is defined by appended claims.

What is claimed is:

1. A fabricating method of a single substrate display panel, comprising:
   providing only a parallel electric field substrate; and
   forming a display medium layer above the parallel electric field substrate; and
   providing only a polarizer having a transmissive axis;
   wherein
   the display medium layer comprise liquid crystal molecules and a matrix, the matrix encapsulating the liquid crystal molecules so that the liquid crystal molecules form liquid crystal groups; and
   the liquid crystal molecules in the display medium layer have an orientation parallel or perpendicular to the transmissive axis of the polarizer.

2. The fabricating method of a single substrate display panel of claim 1 wherein forming of the display medium layer above the parallel electric field substrate further comprises:
   applying a composite at least comprising liquid crystal molecules and a monomer on the parallel electric field substrate; and
   curing the applied composite so as to form display medium layer.

3. The fabricating method of a single substrate display panel of claim 1 wherein forming of the display medium layer above the parallel electric field substrate further comprises:
   applying a composite at least comprising liquid crystal molecules and a monomer on the parallel electric field substrate;
   attaching a temporary substrate to the substrate applied with the composite and curing the composite between the temporary substrate and the substrate so as to form display medium layer; and
   removing the temporary substrate.

4. The fabricating method of a single substrate display panel of claim 2 wherein the monomer in the applied composite has a weight percentage of 1-5% in the composite.

5. The fabricating method of a single substrate display panel of claim 3 wherein the monomer in the applied composite has a weight percentage of 1-5% in the composite.

6. The fabricating method of a single substrate display panel of claim 2 wherein the applied composite on the parallel electric field substrate further comprises a photo initiator or a thermal initiator and curing of the composite are performed with radiation or heating.

7. The fabricating method of a single substrate display panel of claim 3 wherein the applied composite on the parallel electric field substrate further comprises a photo initiator or a thermal initiator and curing of the composite are performed with radiation or heating.

8. The fabricating method of a single substrate display panel of claim 4 wherein the applied composite on the parallel electric field substrate further comprises a photo initiator or a thermal initiator and curing of the composite are performed with radiation or heating.

9. The fabricating method of a single substrate display panel of claim 5 wherein the applied composite on the parallel electric field substrate further comprises a photo initiator or a thermal initiator and curing of the composite are performed with radiation or heating.

10. The fabricating method of a single substrate display panel of claim 6 wherein the photo initiator or thermal initiator in the applied composite has a weight percentage of 0.01-20% in the composite.

11. The fabricating method of a single substrate display panel of claim 7 wherein the photo initiator or thermal initiator in the applied composite has a weight percentage of 0.01-20% in the composite.

12. The fabricating method of a single substrate display panel of claim 8 wherein the photo initiator or thermal initiator in the applied composite has a weight percentage of 0.01-20% in the composite.

13. The fabricating method of a single substrate display panel of claim 9 wherein the photo initiator or thermal initiator in the applied composite has a weight percentage of 0.01-20% in the composite.

14. The fabricating method of a single substrate display panel of claim 1 wherein the liquid crystal molecules has an ordinary refractive index $n_o$ in a non rotational state without being actuated by an electric field and an extraordinary refractive index $n_e$, the ordinary refractive index $n_o$ matches with refractive index $n_p$ of the matrix and the extraordinary refractive index $n_e$ does not matches with the refractive index $n_p$ of the matrix; or the liquid crystal molecules has an extraordinary refractive index $n_e$ in a rotational state upon being actuated by an electric field and an ordinary refractive index $n_o$, the extraordinary refractive index $n_e$ matches with refractive index $n_p$ of the matrix and the ordinary refractive index $n_o$ does not match with the refractive index $n_p$ of the matrix.

15. The fabricating method of a single substrate display panel of claim 1 wherein the polarizer and the display medium are formed on the same side or opposite sides of the substrate.

16. The fabricating method of a single substrate display panel of claim 1 wherein the display medium layer further comprises spacers.

17. The fabricating method of a single substrate display panel of claim 16 wherein the spacers have a weight percentage of 0.01-5% in the display medium layer.

18. The fabricating method of a single substrate display panel of claim 1 further comprising providing a protective layer formed above the display medium layer.

* * * * *